United States Patent [19]

Panenka

[11] Patent Number: 5,734,104
[45] Date of Patent: Mar. 31, 1998

[54] LAPLACE GRAVITY GRADIOMETER

[76] Inventor: Jerry R. Panenka, c/o 505-1104-15th Avenue S.W. Calgary, Alberta, Canada, T2R 1K6

[21] Appl. No.: 823,833

[22] Filed: Mar. 25, 1997

Related U.S. Application Data

[63] Continuation of Ser. No. 596,199, filed as PCT/CA94/00422 Aug. 16, 1994 published as WO95/05614 Feb. 23, 1995, abandoned.

[30] Foreign Application Priority Data

Aug. 16, 1993 [CA] Canada ................. 2104180

[51] Int. Cl.$^6$ ................................. G01V 7/16
[52] U.S. Cl. ....................... 73/382 G; 364/420
[58] Field of Search ................ 73/382 G, 382 R; 364/420

[56] References Cited

U.S. PATENT DOCUMENTS

| | | | |
|---|---|---|---|
| 5,339,684 | 8/1994 | Jircitano et al. | 73/178 R |
| 5,357,802 | 10/1994 | Hofmeyer et al. | 73/382 G |

FOREIGN PATENT DOCUMENTS

| | | | |
|---|---|---|---|
| 265707 | 3/1989 | Germany | 73/382 R |
| 269 456 A1 | 6/1989 | Germany . | |

OTHER PUBLICATIONS

Geophysics, vol. 43, No. 1, Feb. 1978, Jordon, "Moving-Base Gravity Gradiometer Surveys and Interpretation", pp. 94–101.

Geophysics, vol. 58, No. 4, Apr. 1993, Jekeli, "A Review of Gravity Gradiometer Survey System Data Analyses", pp. 508–514.

Physical Review Letters, vol. 70, no. 9, Mar. 1993, Moody et al, "Gaiss's Law Test of Gravity at Short Range", pp. 1195–1198.

*Primary Examiner*—John E. Chapman
*Attorney, Agent, or Firm*—Leonard Bloom

[57] ABSTRACT

A gravity gradiometer capable of obtaining the vertical component $T_{zz}$ of the gravity gradient tensor out of the two horizontal components $T_{xx}$ and $T_{yy}$ based on Laplace equation: $T_{zz}=-(T_{xx}+T_{yy})$ comprises a single disc, and two pairs of radially-oriented horizontal axis accelerometers oppositely-mounted on such disc along respective X and Y axes, each pair being capable of providing, respectively, $T_{xx}=T_{x1}-T_{x2}$ and $T_{yy}=T_{y1}-T_{y2}$ where $T_{x1}$ and $T_{x2}$ are the respective outputs of the X axis accelerometers and $T_{y1}$ and $T_{y2}$ are the respective outputs of the Y axis accelerometers. The gravity gradiometer is also capable of obtaining all five independent components of the gravity gradient tensor based on the above Laplace equation and tensor symmetry as follows: One of the above pairs of horizontal axis accelerometers further comprises tangentially oriented horizontal accelerometers capable of providing by subtraction the $T_{xy}$ component of the gravity gradient tensor, and an accelerometer module consisting of two horizontal accelerometers aligned with the radially and tangentially oriented combination is mounted at a location on the Z axis of the disc above or below the disc to provide the $T_{zx}$ and $T_{zy}$ components by subtracting the values of $T_x$ and $T_y$, respectively, at that location from average values of $T_x$ and $T_y$ at the disc plane.

3 Claims, 1 Drawing Sheet

X,Y PLANE

LAPLACE GRAVITY GRADIOMETER

This application is a continuation of application Ser. No. 08/596,199, filed as PCT/CA94/00422, Aug. 16, 1994, published as WO95/05614, Feb. 23, 1995, abandoned.

This invention relates to a gravity gradiometer which obtains components of the gravity gradient tensor using the Laplace equation and tensor symmetry with horizontal accelerometers only.

BACKGROUND OF THE INVENTION

Existing commercial gravity gradiometers depend on measurement of gravity gradients along axes inclined 45 degrees to the vertical (umbrella configuration). Examples of these are the Bell gravity gradient survey system GGSS of Bell-Textron of Buffalo, N.Y. which operates at room temperature, and an experimental University of Maryland gradiometer which requires cryogenic temperatures.

Gravity gradients at 45 degrees to the vertical are more difficult to measure since compensation for a large gravity component (G cos 45°) is required. This involves springs, which are subject to non-linearities, hysteresis, fatigue, tares, inter-atomic slippage, etc. The above Bell GGSS model uses three rotating discs, each populated with four tangentially-oriented single-axis pendulous accelerometers.

Furthermore, gradiometer signals are measured in a relatively strong aircraft motion acceleration noise field, with the vertical components typically several times higher than the horizontal components.

STATEMENT OF THE INVENTION

Applicant has found that there is no need to measure anomalous gradients on a background of strong aircraft sub-vertical gravity accelerations directly, since the full tensor can be derived from horizontal gradients using Laplace equation and the tensor symmetry.

Horizontal gradients can be measured more simply than gradients in the vertical directions by such means as pendulum-based accelerometers (such as Bell VII or XI models of Bell-Textron of Buffalo, N.Y.). A pendulum is stabilized by the force of gravity, and is, therefore, a reliable, sensitive and frequently used inertial element.

A first embodiment of the gravity gradiometer in accordance with the present invention comprises two pairs of radially-oriented horizontal axis accelerometers oppositely-mounted on a single disc along respective X and Y axes, each pair providing, respectively, $T_{xx}=T_{x1}+T_{x2}$ and $T_{yy}=T_{y1}+T_{y2}$ where $T_{x1}$ and $T_{x2}$ are the outputs of the X axis accelerometers and $T_{y1}$ and $T_{y2}$ are the outputs of the Y axis accelerometers.

A second embodiment of the gravity gradiometer in accordance with the present invention provides all five independent components of the gravity gradient tensor using the Laplace equation and tensor symmetry. In this embodiment, one of the two pairs of horizontal axis accelerometers further comprises tangentially oriented horizontal accelerometers providing the $T_{xy}$ component of the gravity gradient tensor. In addition, an accelerometer module consisting of two horizontal accelerometers aligned with the above radial and tangential combination is mounted at a location on the Z axis of the disc above and/or below the disc to provide the $T_{zx}$ and $T_{zy}$ components by subtracting the values of $T_x$ and $T_y$ at that location respectively, from average values of $T_x$ and $T_y$ at the disc plane. Both embodiments include signal processing means for combining the outputs of the accelerometers in order to derive corresponding gravity gradients.

BRIEF DESCRIPTION OF THE DRAWINGS

The invention will now be disclosed, by way of example, with reference to the accompanying drawings in which.

DETAILED DESCRIPTION OF PREFERRED EMBODIMENTS

Before proceeding with the description of the preferred embodiments, let us provide the following well known definitions:

Basic Formulas

Gravity Gradient is a second derivative of Gravity Potential T. It is represented by the second-order nine-component symmetric tensor $T_{ij}$.

$$T_{ij} = \begin{matrix} T_{xx} & T_{xy} & T_{xz} \\ T_{yx} & T_{yy} & T_{yz} \\ T_{zx} & T_{zy} & T_{zz} \end{matrix}$$

On and above the earth surface the value of its in-line (diagonal) components conforms to a well known Laplace equation:

$$T_{xx}+T_{yy}+T_{zz}=0$$

from which follows:

$$T_{zz}=-(T_{xx}+T_{yy})$$

Thus we can obtain vertical component out of the two horizontal components. By virtue of gradient tensor symmetry $$T_{ij}=T_{ji}$$

it is clear that only five of the nine components are independent (which is a well known theorem). Therefore, in order to describe fully the tensor it is sufficient to measure two in-line (diagonal) components and three independent cross-components. None of these has to be a vertical component.

Sensor Geometry

Figure 1:
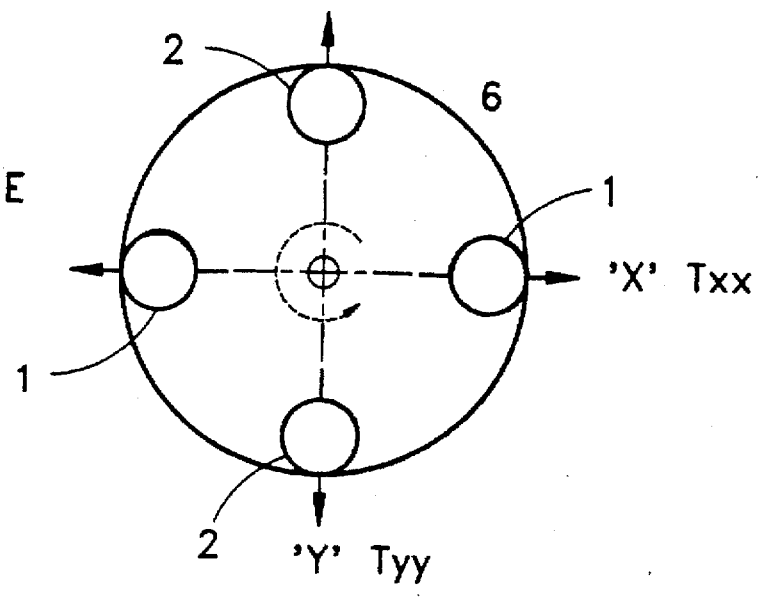
FIG. 1 illustrates an embodiment of a gravity gradiometer which provides the vertical component $T_{zz}$ of the gravity gradient from measurement of horizontal components $T_{xx}$ and $T_{yy}$.

In a first embodiment of the invention illustrated in FIG. 1, the vertical gravity gradient $T_{zz}$ is obtained through Laplace equation $T_{zz}=-(T_{xx}+T_{yy})$ from two horizontal gradients $T_{xx}$ and $T_{yy}$ combining the outputs of two pairs 1 and 2 of radially oriented horizontal axis accelerometers mounted on a horizontal disc 6 along X and Y axes, respectively. Accelerometer pairs 1 and 2 provide $T_{xx}$ and $T_{yy}$.

Figure 2:
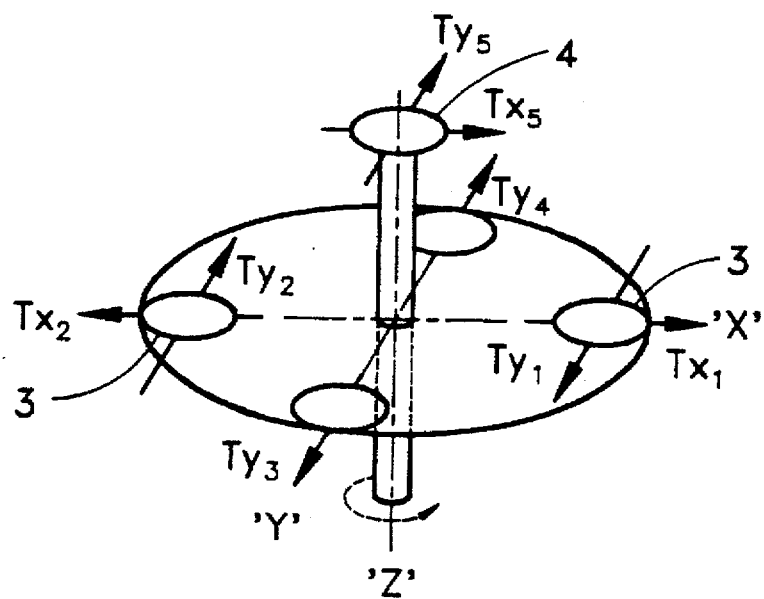
FIG. 2 illustrates an embodiment of a gravity gradiometer providing all five independent components of the gravity gradient tensor from measurement of horizontal components.

In a second embodiment of the invention illustrated in FIG. 2, all five independent components of the gravity gradient tensor can be obtained from horizontal gradients based on Laplace equation and tensor symmetry. In this embodiment, one of the pairs of radially-oriented horizontal accelerometers (pair 1) is replaced with a pair 3 of radially and tangentially oriented horizontal accelerometers 3 providing the $T_{xy}$ component of the gravity gradient sensor. In addition, an accelerometer module 4 consisting of two horizontal accelerometers aligned with the above radial and tangential combination is mounted at a location on the Z axis above or below the disc to provide the $T_{zx}$ and $T_{zy}$ components by subtracting the values of $T_x$ and $T_y$, respectively, at that location from average values of $T_x$ and $T_y$ at the disc plane.

As noted previously, both embodiments include signal processing means for combining the outputs of the several accelerometers in order to derive corresponding gravity gradients. The signal processing means, as those skilled in this art will appreciate, may be of a standard off-the-shelf variety.

The accelerometer disc may be rotated around the vertical axis in order to narrow the signal bandwidth and reduce noise thus increasing signal-to-noise ratio, which is a standard industry practice, as for example in Bell GGSS gravity gradiometer.

The second embodiment can obtain the full tensor using a single stationary or rotating horizontal disc configuration rather than three discs in a 45 degree umbrella orientation such as employed in Bell GGSS, or three pairs of spring accelerometers in the same configuration like in the above mentioned University of Maryland cryogenic gradiometer. This simplification results in lower noise as well as a decrease in complexity and cost.

Although the invention has been disclosed, by way of example, with reference to preferred embodiments, it is to be understood that other alternatives are also envisaged within the scope of the following claims:

I claim:

1. A gravity gradiometer providing the vertical component $T_{zz}$ of the gravity gradient tensor out of the two directly measured horizontal components $T_{xx}$ and $T_{yy}$ based on Laplace equation $T_{zz}=-(T_{xx}+T_{yy})$, comprising:

(a) a support;

(b) two pairs of horizontal axis accelerometers oppositely-mounted on said support along respective X and Y axes, each pair providing, respectively, $T_{xx}=T_{x1}+T_{x2}$ and $T_{yy}=T_{y1}+T_{y2}$ where $T_{x1}$ and $T_{x2}$ are the respective outputs of the X axis accelerometers and $T_{y1}$ and $T_{y2}$ are the respective outputs of the Y axis accelerometers, and (c) signal processing means for combining the outputs of the accelerometers in order to derive corresponding gravity gradients.

2. A gravity gradiometer as defined in claim 1 wherein said support comprises a single disc with said two pairs of accelerometers being radially oriented thereon.

3. A gravity gradiometer as defined in claim 2, providing all five independent components of the gravity gradient tensor based on said Laplace equation and tensor symmetry, wherein one of said two pairs of horizontal axis accelerometers further comprises tangentially oriented horizontal accelerometers providing the $T_{xy}$ component of the gravity gradient tensor, and further comprising an accelerometer module having two horizontal accelerometers aligned with said radially and tangentially oriented accelerometers and mounted at a location on the Z axis of the disc above or below the disc to provide the $T_{zx}$ and $T_{zy}$ components by subtracting the values of $T_x$ and $T_y$, respectively, at that location from average values of $T_x$ and $T_y$ at the disc plane; said signal processing means combining the outputs of said accelerometers to derive the corresponding gravity gradients.

* * * * *